United States Patent
Suriyanarayanan et al.

(10) Patent No.: US 7,620,721 B2
(45) Date of Patent: Nov. 17, 2009

(54) PRE-EXISTING CONTENT REPLICATION

(75) Inventors: Guhan Suriyanarayanan, Redmond, WA (US); Huisheng Liu, Sammamish, WA (US); Shobana M. Balakrishnan, Redmond, WA (US); Nikolaj S. Bjørner, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 696 days.

(21) Appl. No.: 11/364,235

(22) Filed: Feb. 28, 2006

(65) Prior Publication Data

US 2007/0220067 A1  Sep. 20, 2007

(51) Int. Cl.
*G06F 15/173* (2006.01)

(52) U.S. Cl. .................. 709/226; 709/223; 709/224; 709/225; 707/E17.005; 707/E17.007; 707/E17.032

(58) Field of Classification Search ......... 709/223–226; 707/E17.005, E17.007, E17.032
See application file for complete search history.

(56) References Cited

U.S. PATENT DOCUMENTS

| | | | |
|---|---|---|---|
| 5,689,706 A | | 11/1997 | Rao |
| 5,724,575 A | * | 3/1998 | Hoover et al. .................. 707/10 |
| 5,806,065 A | * | 9/1998 | Lomet ............................ 707/8 |
| 5,832,514 A | * | 11/1998 | Norin et al. .................. 707/202 |
| 6,256,634 B1 | * | 7/2001 | Moshaiov et al. ............ 707/100 |
| 6,779,003 B1 | | 8/2004 | Midgley |
| 6,912,534 B2 | | 6/2005 | DeBettencourt |
| 6,920,507 B1 | | 7/2005 | Kley |
| 6,925,477 B1 | | 8/2005 | Champagne |
| 6,952,741 B1 | | 10/2005 | Bartlett |
| 2003/0041093 A1 | | 2/2003 | Yamane |
| 2003/0056013 A1 | | 3/2003 | Laschkewitsch |
| 2003/0130984 A1 | * | 7/2003 | Quinlan et al. ................. 707/1 |
| 2004/0177100 A1 | * | 9/2004 | Bjorner et al. .............. 707/206 |
| 2005/0015413 A1 | * | 1/2005 | Teodosiu et al. ............ 707/201 |
| 2005/0071391 A1 | | 3/2005 | Fuerderer |

FOREIGN PATENT DOCUMENTS

GB  WO0049526  8/2000

OTHER PUBLICATIONS

Distributed File System and File Replication Services; http://www.microsoft.com/windowsserver2003/techinfo/overview/dfs.mspx.
Introduction to DFS Replication; http://technet2.microsoft.com/WindowsServer/en/Library/8c4cf2e7-0b92-4643-acbd-abfa9f189d031033.mspx.

(Continued)

*Primary Examiner*—Dohm Chankong
*Assistant Examiner*—Tauqir Hussain
(74) *Attorney, Agent, or Firm*—Workman Nydegger

(57) ABSTRACT

Aspects of the subject matter described herein relate to replicating initial content in resource replication systems. In aspects, each member participating in a replica group obtains a content set state from a directory service. The content set state indicates whether the member is allowed to synchronize resources with another member participating in the replica group. If the member is designated as a primary member, the member may replicate out resources to its downstream partners. If a member is not designated as a primary member, the member may not replicate out resources to its downstream partners until it has successfully synchronized resources with an upstream partner. Fence values may be set which control which resources win (and are replicated out) during synchronization.

22 Claims, 5 Drawing Sheets

OTHER PUBLICATIONS

Replication in Ficus Distributed File Systems; http://www.isi.edu/johnh/PAPERS/Popek90a.pdf.

The Coda Distributed File System; http://www.coda.cs.cmu.edu/linaner/lj.html.

A Falut-Tolerant Model for Replication in Distributed-File Systems; http://nr.stic.gov.tw/ejournal/ProceedingA/v23n3/402-410.pdf.

Experience of Adaptive Replication in Distributed File Systems; http://ieeexplore.ieee.org/ie13/3987/11477/00546470.pdf?isNumber=.

Distributed File System and File Replication Services; http://www.microsoft.com/windowsserver2003/techinfo/overview/dfs.mspx, Mar. 21, 2003.

Introduction to DFS Replication; http://technet2.microsoft.com/WindowsServer/en/Library/8c4cf2e7-0b92-4643-acbd-abfa9f189d031033.mspx, Mar. 21, 2003.

Replication in Ficus Distributed File Systems; http://www.isi.edu/johnh/PAPERS/Popek90a.pdf, Nov. 1990.

The Coda Distributed File System; http://www.coda.cs.cmu.edu/linaner/lj.html, Jun. 1998.

A Falut-Tolerant Model for Replication in Distributed-File Systems; http://nr.stic.gov.tw/ejoural/ProceedingA/v23n3/402-410.pdf, Apr. 28, 1998.

Experience of Adaptive Replication in Distributed File Systems; http://ieeexplore.ieee.org/ie13/3987/11477/00546470.pdf?isNumber= , Sep. 1996.

* cited by examiner

PRE-EXISTING CONTENT REPLICATION

BACKGROUND

Systems for replicating resources are becoming increasingly important to ensure availability and fault tolerance in large networks. Corporate networks that replicate files containing domain credentials and policies are one example where availability, scalability, consistency, and reliability are needed. Replicating initial content efficiently and correctly, however, is problematic.

SUMMARY

Briefly, aspects of the subject matter described herein relate to replicating initial content in resource replication systems. In aspects, each member participating in a replica group obtains a content set state from a directory service. The content set state indicates whether the member is allowed to synchronize resources with another member participating in the replica group. If the member is designated as a primary member, the member may replicate out resources to its downstream partners. If a member is not designated as a primary member, the member may not replicate out resources to its downstream partners until it has successfully synchronized resources with an upstream partner. Fence values may be set which control which resources win (and are replicated out) during synchronization.

This Summary is provided to briefly identify some aspects of the subject matter that is further described below in the Detailed Description. This Summary is not intended to identify key or essential features of the claimed subject matter, nor is it intended to be used to limit the scope of the claimed subject matter.

The phrase "subject matter described herein" refers to subject matter described in the Detailed Description unless the context clearly indicates otherwise. The term "aspects" should be read as "one or more aspects". Identifying aspects of the subject matter described in the Detailed Description is not intended to identify key or essential features of the claimed subject matter.

The aspects described above and other aspects will become apparent from the following Detailed Description when taken in conjunction with the drawings, in which:

DETAILED DESCRIPTION

Exemplary Operating Environment

Figure 1:
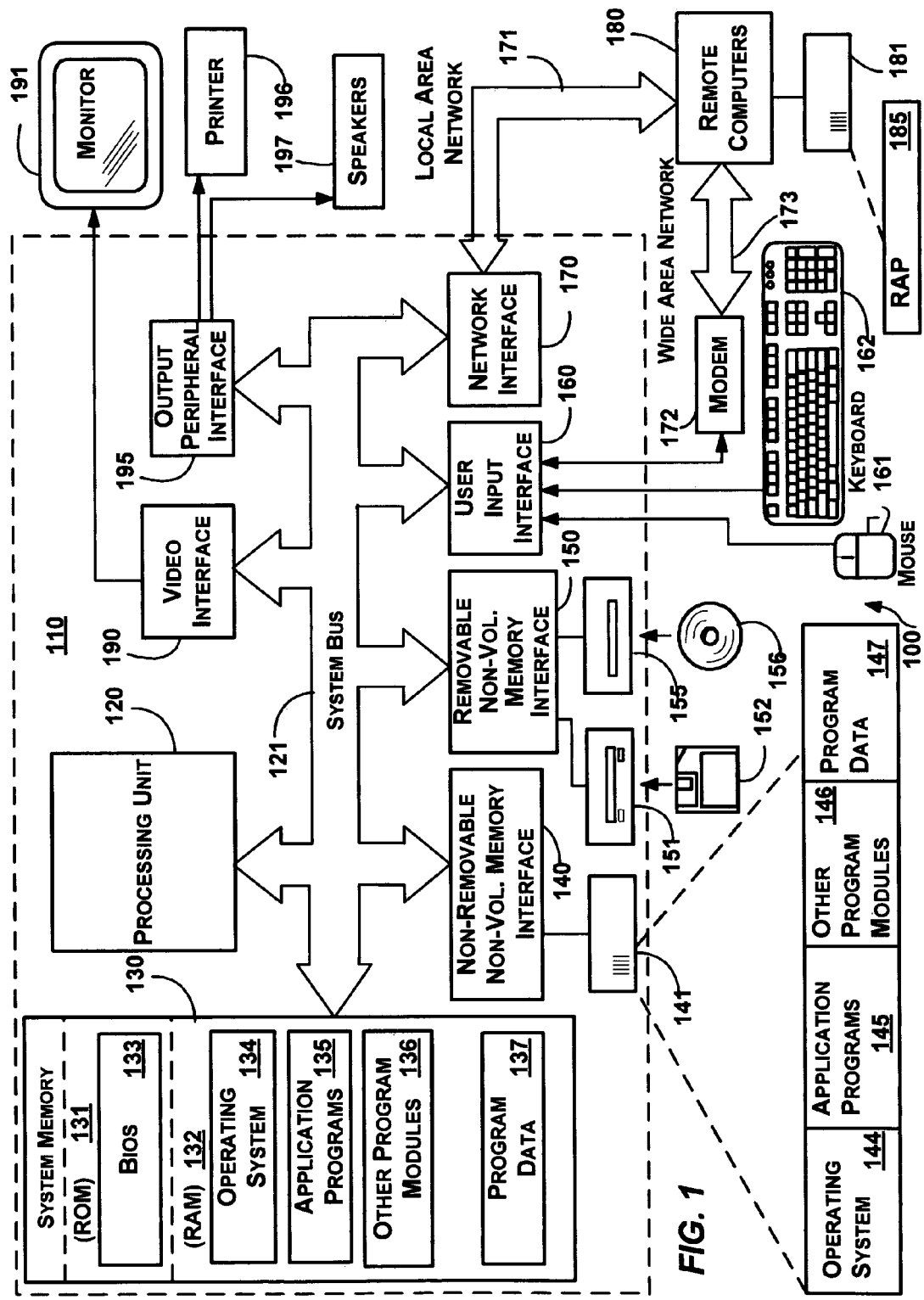
FIG. 1 is a block diagram representing a computer system into which aspects of the subject matter described herein may be incorporated.

FIG. 1 illustrates an example of a suitable computing system environment 100 on which aspects of the subject matter described herein may be implemented. The computing system environment 100 is only one example of a suitable computing environment and is not intended to suggest any limitation as to the scope of use or functionality of aspects of the subject matter described herein. Neither should the computing environment 100 be interpreted as having any dependency or requirement relating to any one or combination of components illustrated in the exemplary operating environment 100.

Aspects of the subject matter described herein are operational with numerous other general purpose or special purpose computing system environments or configurations. Examples of well known computing systems, environments, and/or configurations that may be suitable for use with aspects of the subject matter described herein include, but are not limited to, personal computers, server computers, handheld or laptop devices, multiprocessor systems, microcontroller-based systems, set top boxes, programmable consumer electronics, network PCs, minicomputers, mainframe computers, distributed computing environments that include any of the above systems or devices, and the like.

Aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing aspects of the subject matter described herein includes a general-purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 110. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, a touch-sensitive screen of a handheld PC or other writing tablet, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Content Replication

As will readily be appreciated, modern machines may process thousands of resource changes in a relatively short period of time. Replicating these resources and keeping them synchronized across hundreds or thousands of machines connected via various networks of varying reliability and bandwidth poses a significant challenge.

Optimistic, multi-master replication systems allow unrestricted changes to replicated content on any machine participating in a given replica group. A replica group comprises a set of resources which are replicated on machines participating in the replica group. The set of resources of a replica group may span volumes. For example, a replica group may include resources associated with C:\DATA, D:\APPS, and E:\DOCS which may be replicated on a set of machines participating in the replica group. Potentially conflicting changes are reconciled under the control of the replication system using a set of conflict resolution criteria that defines, for every conflict situation, which conflicting change takes precedence over others.

The term "machine" is not limited simply to a physical machine. Rather, a single physical machine may include multiple virtual machines. Replication from one machine to another machine, as used herein, implies replication of one or more members of the same replica group from one machine, virtual or physical, to another machine, virtual or physical. A single physical machine may include multiple members of the same replica group. Thus, replicating members of a replica group may involve synchronizing the members of a single physical machine that includes two or more members of the same replica group.

A resource may be thought of as an object. Each resource is associated with resource data and resource metadata. Resource data may include content and attributes associated with the content while resource metadata includes other attributes that may be relevant in negotiating synchronization and in conflict resolution. Resource data and metadata may be stored in a database or other suitable store; in an alternate embodiment, separate stores may be used for storing resource data and metadata.

In replication systems including data stores based on named files in a file system, resource data may include file contents, as well as any file attributes that are stored on the file system in association with the file contents. File attributes may include access control lists (ACLs), creation/modification times, and other data associated with a file. As used herein, a file may include directories (i.e., file system objects that may be associated with descendant files and directories and ancestor directories) and non-directories. Unless the context clearly indicates otherwise, the term file may be read as "resource data."

In replication systems including data stores not based on named files in a file system (e.g., ones in which resources are stored in a database or object-based data store), resource data appropriate to the data store is stored. Throughout this document, replication systems based on files in a file system are sometimes used for illustration, but it will be recognized that any data store capable of storing content may be used without departing from the spirit or scope of the subject matter described herein.

For each resource, resource metadata may include a globally unique identifier (GUID), whether the resource has been deleted, a version sequence number together with authorship of a change, a clock value to reflect the time a change occurred, and other fields, such as a digest that summarizes values of resource data and may include signatures for resource content. A digest may be used for a quick comparison to bypass data-transfer during replication synchronization, for example. If a resource on a destination machine is synchronized with content on a source machine (e.g., as indicated by a digest), network overhead may be minimized by transmitting just the resource metadata, without transmitting the resource data itself. Transmitting the resource metadata is done so that the destination machine may reflect the metadata included on the source machine in its subsequent replication activities. This may allow the destination machine, for example, to become a source machine in a subsequent replication activity. Resource metadata may be stored with or separate from resource data without departing from the spirit or scope of the subject matter described herein.

Version vectors may be used when replicating resources. A version vector may be viewed as a global set of counters or clocks of machines participating in a replica group. Each machine participating in the replica group maintains a version vector that represents the machine's current latest version and the latest versions that the machine has received with respect to other machines. Each time a resource is created, modified, or deleted from a machine, the resource's version may be set to a version number equivalent to the current version number for that machine plus one. The version vector for that machine is also updated to reflect that the version number for that machine has been incremented.

During synchronization, a version vector may be transmitted for use in synchronizing resources. For example, if machines A (a downstream machine) and B (an upstream machine) engage in a synchronization activity such as a join, machine B may transmit its version vector to A. Upon receiving B's version vector, A subtracts its version vector from the version vector received from B and sends the difference to B. B may then transmit changes for all resources, if any, that have versions in the difference.

Examples of use of version vectors in synchronization have been described in U.S. patent application Ser. No. 10/791,041 entitled "Interval Vector Based Knowledge Synchronization for Resource Versioning", U.S. patent application Ser. No. 10/779,030 entitled "Garbage Collection of Tombstones for Optimistic Replication Systems", and U.S. patent application Ser. No. 10/733,459 entitled, Granular Control Over the Authority of Replicated Information via Fencing and UnFencing".

Figure 2:
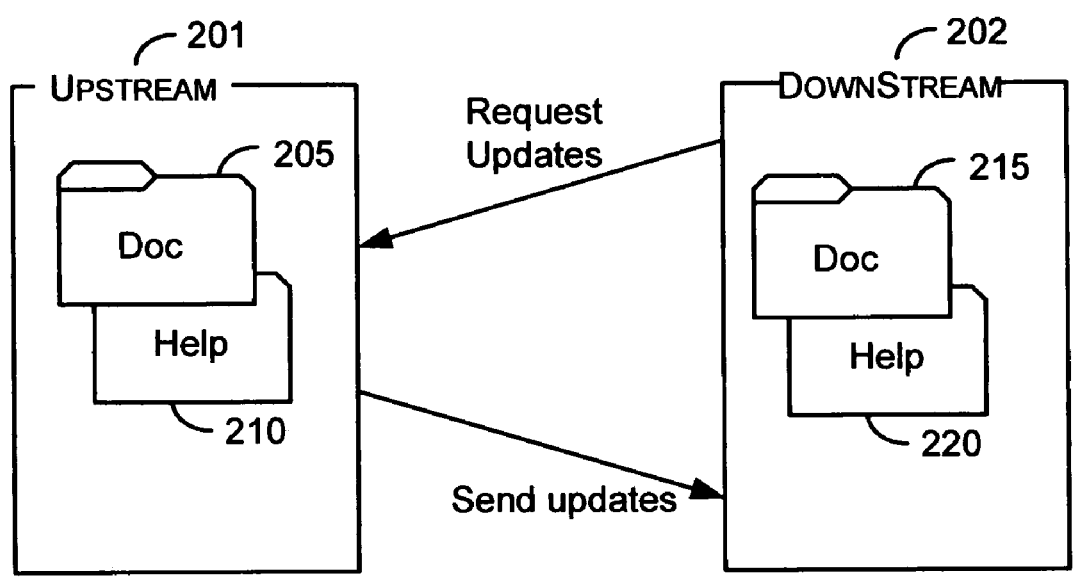
FIG. 2 is a block diagram that generally represents an upstream and a downstream machine that participate in a replica group in accordance with aspects of the subject matter described herein.

FIG. 2 is a block diagram that generally represents an upstream and a downstream machine that participate in a replica group in accordance with aspects of the subject matter described herein. As an example, an upstream machine 201 and a downstream machine 202 may participate in a replica group that includes two resources. These two resources may include, for example, documents directories 205 and 215 and help directories 210 and 220 (which are given different number on the two machines to indicate that at a particular moment in time, these resources may not include the same resource data—i.e., they may be out-of-sync).

At some point the downstream machine may request updates from the upstream machine 201 and may update its files based on the updates. Although only two machines are shown in FIG. 2, the upstream and downstream machines 201 and 202 may be part of a replication system that includes many other machines. A machine that is a source in one interaction (sometimes called an upstream machine) may later become a destination (sometimes called a downstream machine) in another interaction and vice versa.

Figure 3:
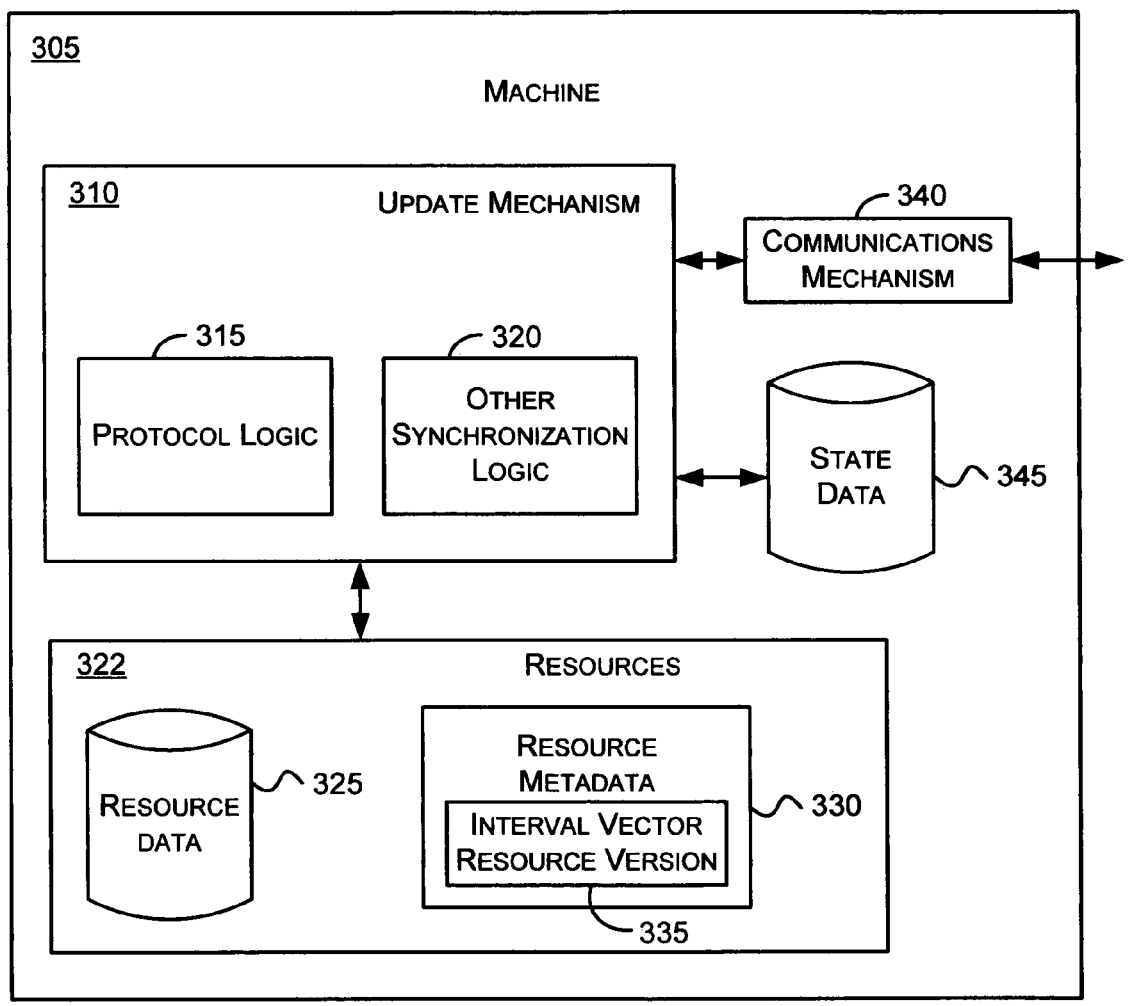
FIG. 3 is a block diagram representing a machine configured to operate in a resource replication system in accordance with aspects of the subject matter described herein.

FIG. 3 is a block diagram representing a machine configured to operate in a resource replication system in accordance with aspects of the subject matter described herein. The machine 305 includes an update mechanism 310, resources 322, a communications mechanism 340, and state data 345.

The resources 322 include the resource data store 325 for storing resource data and the resource metadata store 330. Although shown in the same box, the resource data store 325 may be stored together or in a separate store relative to the resource metadata store 330. Among other things, the resource metadata store 330 may include versions for each of the resource data records stored in the resource store 325 and may also include an interval vector (block 335).

The communications mechanism 340 allows the update mechanism 310 to communicate with other update mechanisms (not shown) on other machines. The communications mechanism 340 may be a network interface or adapter 170, modem 172, or any other means for establishing communications as described in conjunction with FIG. 1.

The update mechanism 310 includes protocol logic 315 that operates to communicate with other replication partners. The other synchronization logic 320 includes synchronization logic other than the protocol logic (e.g., what to do in case of conflicting updates, how to determine which updates to obtain, and so forth). Although the protocol logic 315 and the other synchronization logic 320 are shown as separate boxes, in other embodiments, they may be combined in whole or in part.

State data 345 includes content state information that indicates which state the member is in as described in more detail below. Briefly, these states may include "initial-primary" or "initial-building", "initial-sync-needed" or "initial-sync", and "normal". Hereinafter "initial-sync-needed" is used to represent "initial-sync" and/or "initial-sync-needed."

As used herein, replication service may include any one or more of the components described above in conjunction with FIG. 3.

In operation, the machine 305 may operate as a downstream machine and/or an upstream machine. A downstream machine may establish a connection with an upstream machine for a replica group in which both the upstream and downstream machines participate. This may be done through the communications mechanism 340, for example. In establishing the connection, each of the partners (i.e., the upstream and downstream machines) may send its version vector to the other partner. Then, a session is established to send updates from the upstream machine to the downstream machine.

A session may be used to bind a replicated folder of an upstream machine with its corresponding replicated folder of a downstream machine. A session may be established for each replicated folder of a replica group. The sessions for multiple folders may be established over a single connection between the upstream and downstream machines.

After all updates from a session have been processed or abandoned, the downstream machine may close the session.

The downstream machine may request (e.g., via the communications mechanism 340) that the upstream machine notify the downstream machine when updates for any resources associated with the session occur. When the upstream machine notifies the downstream machine that updates are available, the downstream machine requests the version vector for the updates. In response the upstream machine sends its version vector (sometimes referred to as "VVup"). Note that VVup may include a complete version vector or a version vector that includes changes since the last version vector was sent. Notifying the downstream machine that updates are available and waiting for the downstream machine to request the updates may be performed in two steps so that a downstream machine is not accidentally flooded with version vectors from multiple upstream partners.

The downstream machine uses the upstream version vector it receives (i.e., "VVup") and computes a set-difference with its own version vector to compute versions residing on the upstream machine of which the downstream machine is unaware. The downstream machine may then request metadata regarding the versions. In requesting the updates, the downstream machine may include a delta version vector that indicates which updates the downstream machine needs.

A downstream machine may request for tombstones or live updates separately or together. A tombstone represents that a resource has been deleted and live updates represent updates that do not delete a resource. In some implementations, the downstream machine may request tombstones before it requests live updates. This may be done to improve efficiency as a resource that has been modified and then deleted does not need to be modified before it is deleted on a replication partner. In addition, processing a tombstone before a live update may clear a namespace of the data store (e.g., in a file system) of the downstream machine in preparation for processing a live replacement update.

After receiving the updates, the downstream machine may begin processing the updates to determine which resource data or portion thereof associated with the updates to request from the upstream machine. This processing, for example, may be performed through the other synchronization logic 340 which may be broken into multiple components (not shown). For example, an update may indicate that resource data of a particular resource or a portion thereof has been changed. In one embodiment, all the resource data associated with the resource may be requested by the downstream machine. In another embodiment, a portion of the resource data that includes the change may be requested by the downstream machine. As used herein, an interaction (e.g., request, response, update, and so forth) involving resource data should be understood to mean an interaction involving a portion or all of the resource data associated with a resource. For example, a request for resource data may mean a request for a portion or all of the resource data associated with a resource.

After determining resource data that needs to be requested, the downstream machine may request the resource data. In response, to a request for resource data, the upstream machine may send the resource data associated with a resource. Requests and responses may continue until all resource data which the downstream machine has determined needs to be updated has been requested. Note, that not all resource data may be sent as an upstream machine may no longer have a requested resource data if the resource has been deleted, for example. Another example in which resource data may not be sent is if the only effective change relative to the downstream machine is that the resource was renamed or that metadata attributes were updated. In such cases, receiving the update and renaming a local resource or updating local metadata may be all that is needed to synchronize the downstream resource with the upstream resource.

A session may be closed, for example, if a replicated folder is deleted, if a non-recoverable error occurs during replication, or if a replication system is shut down. Otherwise, the established session may be used for subsequent synchronization actions that involve all or a portion of the events above.

The update mechanism 310 may use a database (e.g., resource metadata store 330) to keep track of file and directory states of resource data in the resource data store 325. Each time a resource is updated, the resource may be assigned a new version in the database.

The update mechanism 310 may receive updates from an upstream partner and update local resources so that they are in sync with replicated resources on the upstream partner. Updates to the resource metadata may be stored in the resource metadata store 330 while updates to the resource data may be stored in resource data store 325. In one embodiment, the resource data store 325 and the resource metadata store 330 may be included on the same volume or physical device (e.g., hard drive).

The resource data may also be changed by local file activity related to the resource data. For example, the downstream machine may serve as a file server to many client machines (not shown). The client machines may access and modify resource data (e.g. as files) on the downstream machine. The update mechanism 310 may include a resource data change monitor (not shown) that may monitor for changes to replicated resources (e.g., changes to files). When a replicated resource changes, the resource change monitor may update the resource metadata store 330 to indicate the update. This may serve to keep the resource metadata store 330 in sync with the resource data 325 and for synchronization between replica group members.

Pre-existing Content

A pre-existing content set comprises resource data (e.g., a set of files under a root directory) that exists on a member participating in a replica group before the member has received configuration information for the content set or finished internally initializing the content set, which typically occurs very shortly after the member has knowledge of the content set.

When a content set is created, a replication system may ask a user to designate one content set member (e.g., the content set residing on one of the members participating in the replica group) as the primary member. When creating configuration objects in a directory service for the content set, the subscription object may be marked with a PRIMARY flag. Directory services may execute on a set of servers at least one of which each member participating in the replica group may access to determine content set state. One example of a directory service is Active Directory by Microsoft Corporation.

At least two aspects of the subject matter described herein may be used to help correct initialization behavior for a content set. The first aspect is a state associated with a content set on each member that is persisted in the resource metadata store of the member. A content set may be in three states: initial-primary, initial-sync-needed, and normal. In another embodiment, the three states may comprise: initial-building, initial-sync-needed, and normal. These states may be used as described below to determine replication order to minimize initial replication traffic.

The second aspect is one of assigning "fence values" for each resource data. Fence values may be stored in the resource metadata store 330. Each fence value may be associated with a resource data (e.g., a file) by storing the fence value in a record of the resource data store 325. Similar to content set states, three fence values may be used for this: initial-primary, initial-sync-needed, and normal. The fence values may be used as described below by conflict resolution logic during replication of the resource, to ensure that the content sets of each of the members participating in the replica group converge to the user-intended version of each resource.

Content set state may apply to an entire content set and may be used to determine if replication should be allowed to happen between two members. Fence values, on the other hand, are per resource and may be used to determine which copy of the resource wins (and is replicated out) in a conflict once synchronization between two members occurs.

When a replication service on a member begins executing, it may request configuration information for a content set from a directory service. When the replication service receives the configuration information, an attribute (e.g., the Options attribute) of the configuration information may be set to indicate if the member associated with the replication service is a designated primary member for that content set. This controls the initialization behavior for that content set as follows.

In one embodiment, when first initializing a content set on a member that is designated as the primary-member, the following actions may occur:

1. The content set state in the state data of the replication service may be set to "initial-primary." This is used later by the replication service to determine if it should accept replication requests from downstream partners for that content set.

2. The resource metadata records of each resource for that content set may be marked with a special fence value of "initial-primary."

3. An event to the event log is logged that indicates that the content set has been successfully initialized, and is in the "initial-primary" state.

In another embodiment, when first initializing a content set on a member that is designated as the primary-member, the following actions may occur:

1. The content set state is set to "initial-building" when the content set is scanned to build metadata associated with the content set.

2. When they are first scanned, resources are marked with an "initial-primary" fence value.

3. After scanning completes, an event to the event log is logged that indicates that the content set has been successfully initialized. In addition, the content set state is set to "normal" and the member may then replicate out resources to downstream partners and synchronize with upstream partners.

In one embodiment, when first initializing a content set on a member that is not designated as the primary-member, the following actions may occur:

1. The content set state in the state data is set to "initial-sync-needed." This is used later by the replication service to determine if it should accept replication requests from downstream partners for that content set.

2. The resource metadata records of each resource in that content set are marked with a special fence value of "initial-sync-needed."

3. An event is logged to the event log that indicates that the content set has been successfully initialized, and is in the "initial-sync-needed" state.

In another embodiment, when first initializing a content set on a member that is not designated as the primary-member, the following actions may occur:

1. The content set state is set to "initial-building" when the content set is scanned to build metadata associated with the content set.

2. When they are first scanned, resources are marked with an "initial-sync-needed" fence value.

3. After scanning completes, an event to the event log is logged that indicates that the content set has been successfully initialized. In addition, the content set state is set to "initial-sync-needed"

In either embodiment, after the member's content set state is set to "initial-sync-needed," the member may begin attempting to synchronize with upstream partners. Furthermore, a member in the "initial-sync-needed" stage may refuse requests to synchronize from downstream partners until it has successfully completed synchronization with an upstream partner. When the member has successfully completed synchronization with an upstream partner, the member's content set state is set to "normal."

In one embodiment, the content set may be in the "initial-primary" state on one (and exactly one) member in the replica group while being in the "initial-sync-needed" state on all other members. Initially, no members may have a content set in "normal" state. This sets the stage for the initial replication sequence leading to content set convergence to the user-intended versions of the resources.

In another embodiment, the content set state may be in "normal" state on one (and exactly one) member in the replica group while being in an "initial-sync-needed" state on all other members. This sets the stage for the initial replication sequence leading to content set convergence to the user-intended versions of the resources.

In one embodiment, the content set may be in "initial-primary" state on multiple members in the replica group while being in an "initial-sync-needed" state on other members.

In another embodiment, the content set may be in "normal" state on multiple members in the replica group while being in an "initial-sync-needed" state on other members.

For synchronization to proceed it is helpful if at least one member in an initial-primary or normal state is reachable (possibly indirectly reachable) at any given time.

After the initialization described above, for a given replica group, the replication service on each downstream member may attempt to establish a connection with each of its upstream partners and initiate replication for each content set in its replica group. This may occur regardless of whether a content set is in the initial-primary, normal, or initial-sync-needed state on the downstream member.

On an upstream member, if a replication request is received for a content set on the upstream member that is in an initial-sync-needed state, the replication request is failed and a message including a well-known error code is sent to the downstream partner. The well-known error code indicates to the downstream partner that the content set of the upstream partner is in an initial-sync-needed state. This leads to no outbound replication occurring from a member on which the content-set is in initial-sync-needed state. Note that this also implies that if there is no designated primary member for a given content set anywhere in the system, no replication may occur for that content set until a primary member is designated.

In another embodiment, however, a primary member is automatically designated even with the possibility of selecting the wrong primary member and converging to a stale version of the data. In one embodiment, the primary member may be automatically selected as the one upon which the content set was first installed. In another embodiment, the primary member may be automatically determined by site. In another embodiment, a primary member may be chosen dynamically as a result of a negotiation, when two non-primary members attempt to synchronize. In yet other embodiments, other criteria may be used to select the primary member.

If the content set is in initial-primary or normal state on an upstream member, a request for synchronization is allowed to complete successfully. Replication for that content set thus first commences for downstream partners of the designated primary member. When this replication between partners completes for that content set, the state of the content set is changed to "normal" on the downstream. As replication is completed for each resource, the fence value of the state data for that resource on the downstream is changed to "normal" (if it has any of the three fence values listed previously).

Replication flow for a content set thus commences from the designated primary member to its downstream partners, then further to their downstream partners, and so on. It is useful to think of data as being initially "certified" on the primary member, and as each downstream member finishes replication with a member with "certified" data, data on that member becomes "certified" as well. In one embodiment, through this, members may receive only "certified" inbound data, either through replication directly with a primary member, or another member on which the data has been "certified."

In addition, when a primary member attempts to replicate with one of its upstream partners, initially, the primary member may not get any data from its upstream partner (since the upstream partners will typically be in "initial-sync-needed" state). Once the content set state on an upstream partner changes to normal state, however, the primary member may then replicate data from the upstream partner.

In one embodiment, after successfully replicating data to one downstream partner, the content set state on the primary member may be changed to "normal." In another embodiment, after scanning completes on a primary member during the "initial-building" state, the content set state on the primary member is changed to "normal" even before the primary member has successfully replicated data to a downstream partner. As replication is completed for each resource, the fence value of the resource metadata record for that resource on the downstream may be changed to "normal" state (if it is in any of the three states listed previously).

At this point, the primary member is no longer special for the content set it has just successfully replicated out to a downstream partner; rather, the primary member is just another member participating in the replica group. The replication service on a designated primary member may clear the primary flag in the directory service for the content set, by setting the primary flag in the directory service to 0 for the relevant subscription object.

If the replication service fails to clear the flag, the replication service may log an event (e.g., EVENT_DFSR_CONFIG_DS_UPDATE_FAILED) and continue to attempt to clear the flag each time the replication service polls the directory service. Note that the failure to clear the flag may not have harmful effects (e.g., effects that affect correctness) even in the face of database loss and other errors on a primary member at a subsequent time. If the replication service successfully clears the flag, the replication service may log an event (e.g., EVENT_DFSR_CONFIG_DS_UPDATE_SUCCEEDED).

In one embodiment, in a one-way publication topology with no upstream members for a designated primary member, the content set may remain indefinitely in the "initial-primary" state on the designated primary member. It will be recognized that this state is not "harmful".

In another embodiment, however, the content set state of a designated primary member changes to "normal" after initial scanning occurs.

The fence value for a resource is used to guarantee predictable conflict resolution semantics. The conflict resolution semantics for resources with fence values are as follows:

1. A resource marked with a fence value of "normal" wins over a corresponding resource marked with "initial-primary" or "initial-sync-needed." In one embodiment, this behavior is not treated as a normal conflict and may not be reported to a user (e.g., in a conflict manifest) as a conflict.

2. A resource marked "initial-primary" wins over a corresponding resource marked "initial-sync-needed." In one embodiment, this behavior is not treated as a normal conflict, and will not be reported to the user as a conflict.

3. If two resources are marked with the same fence value, other conflict resolution criteria are used as usual (such as file timestamps and so on). This is treated as a conflict and may be reported to the user.

4. Fence values may also be set to timestamps. In this case the higher timestamp wins. Any resource marked with a timestamp value wins over a corresponding resource marked with one of the three special values listed above.

This logic thus deterministically determines conflict winners of replicating corresponding resources in the following order: "normal" over "initial-primary" over "initial-sync-needed."

Once initial replication is complete, the resources may (and typically will) be in "normal" state on all of the members.

After a content set has been initialized by a replication service executing on a member (regardless of whether the member is the designated primary member or not), but before initial replication happens for that content set, if a local update is detected for a resource on the member, the fence value for the resource is set to "normal." Using the logic above, any updates made to a resource after a content set has been initialized may be treated as "certified" and replicated out with the conflict resolution logic described above. Setting the fence value to normal in this case may ensure that the changes to the resource are not overwritten by the content-set initialization activities.

A replication service may have the ability to automatically recover from database loss, by rebuilding the resource metadata by traversing the resource data and recreating the metadata records for each resource. After suffering a resource metadata loss (especially if the replication service was shut down during the resource metadata loss), the replication service may not have any knowledge of the content set. It may not be possible in all cases for the replication service to determine if the content set is new and the data is to be treated as pre-existing content, or if the replication service is recovering from resource metadata loss.

After the resource metadata is rebuilt, in one embodiment, the content set may be treated as if it were in the "initial-sync-needed" state. This may be done to minimize the replication traffic and resource conflicts. Treating the content set this way may be beneficial for both primary and non-primary members, particularly after the primary flag has been successfully cleared in the directory service since afterwards a primary member may be treated as a non-primary member without adverse effects.

Even if a primary member suffers resource metadata loss after successful initial replication but before the primary member has been able to clear the primary flag in the directory service, the fence values have been designed to yield correct behavior. For example, following a resource metadata loss recovery, the content set state and fence values for each of the resources in that content set may be marked as described earlier for pre-existing content.

In particular, a member marked as primary in the directory service may have its content set and fence values set to "initial-primary." A member that is not marked as primary in the directory service may have its content set and fence values set to "initial-sync-needed"

After the resource metadata recovery on the primary member, on the first replication between the primary member acting as a downstream machine and an upstream member:

1. If the content set on the upstream member is in the "normal" state, the version of the resources on the newly recovered primary machine will lose in any conflicts. This results because a fence value of "normal" (or a timestamp) on the upstream member wins over a fence value of initial-primary on the newly recovered downstream, which is the primary machine.

2. If the content set on the upstream member is in the initial-sync-needed state, the upstream member will reject the replication request from the downstream member and the content set on the downstream member will remain in the initial-primary state until successful synchronization with an upstream member of the upstream member.

3. If the content set on the upstream member is in the initial-primary state, this implies that there may be at least two members designated as primary members in the replica group. Both members will replicate successfully (though there may be additional conflicts) and achieve convergence as described later.

Thus, the content on a primary machine recovering from database loss is treated correctly in each of the cases.

Two or more members may be designated as primary in the directory service. With the fence value and conflict resolution semantics described above, the replication service is able to handle this case correctly, though there may be more replication traffic and conflicts reported.

In particular, if two primary members replicate with each other first, the resources on both members will have an equal fence value and one of the versions for each resource may be picked as a conflict winner. The winning copy may then be treated as the "certified copy" on the downstream member of the replication, and replication will continue to proceed throughout the rest of the members participating in the replica group.

If the primary members replicate with other (non-primary) members first, there may be different copies of resources that may be treated as "certified" in the replica group (e.g., one copy by each member designated primary) that replicate through the network. Eventually, there will be conflicts during replication between two different certified versions of the resources. This may result, for example, since the "certified" copies both have a fence value of normal and the same file paths but have different replication system unique identifiers. After the conflicts are resolved, the replica group will converge to the versions of the resources that were declared winners in each of the conflicts.

Thus, in aspects of the subject matter described herein, having multiple primary members does not compromise correctness; it may, however, increase replication traffic and conflicts reported to the user.

Figure 4:
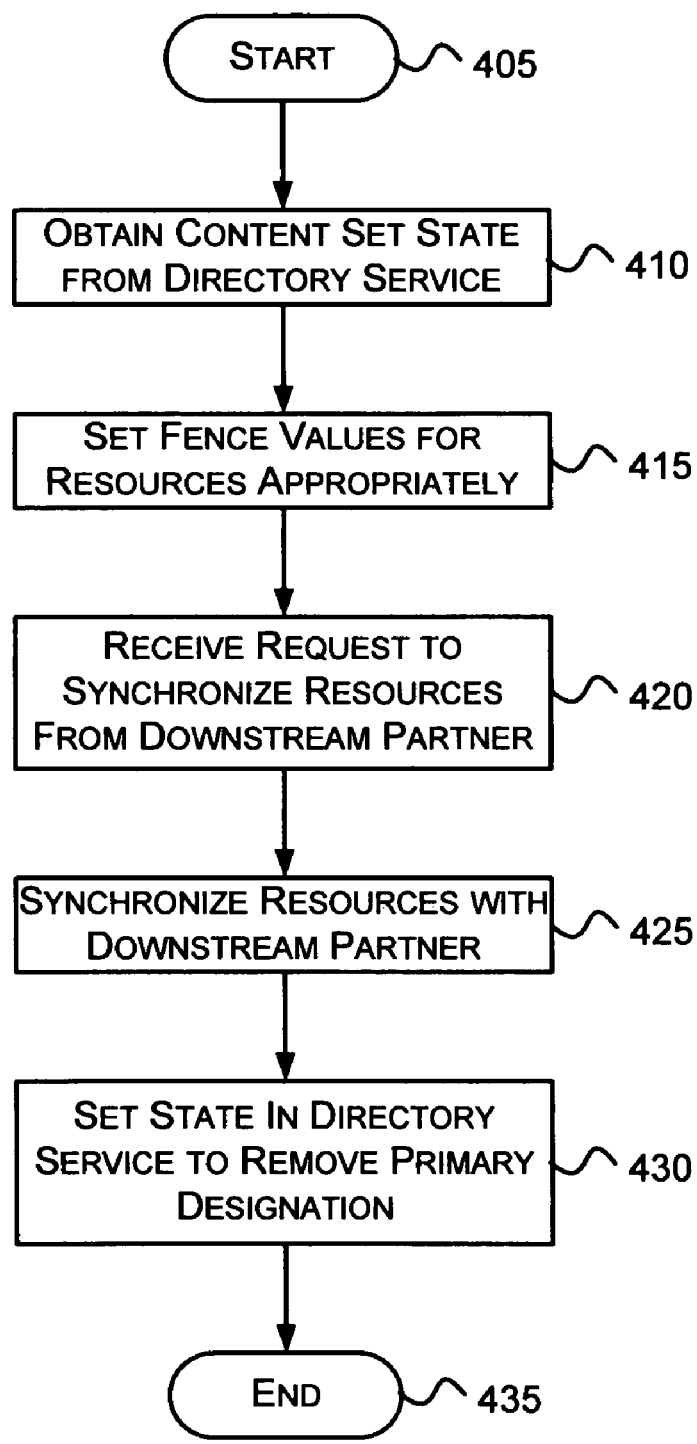
FIG. 4 is a flow diagram that generally represents actions that may occur from a primary member's perspective in accordance with aspects of the subject matter described herein.

FIG. 4 is a flow diagram that generally represents actions that may occur from a primary member's perspective in accordance with aspects of the subject matter described herein. At block 405, the actions start.

At block 410, the content set state is obtained from a directory service and may be stored in state data included on the primary member. The content set state for the primary member indicates that the primary member is allowed to engage in synchronization with a downstream partner.

At block 415, fence values for resources are set as initial-primary. As discussed previously, initial-primary will cause the resources to win against resources with a fence value of initial-sync-needed.

After block 415, the member may request to synchronize resources with an upstream partner. This may occur regardless of whether the content set state of the member is "initial-primary" or "normal".

At block 420, a request to synchronize resources is received from a downstream partner. The downstream partner may be in an initial-sync-needed or normal state. Typically, when the primary partner is still designated primary by the directory service, the downstream partner is in an initial-sync-needed state. At block 425, the primary member allows the request and begins synchronizing resources with the downstream partner.

At block 430, after successful synchronization with the downstream partner, the primary member attempts to set the state in the directory service to remove the primary designation for the primary member. In another embodiment, the actions associated with block 430 may occur after the actions associated with block 415 and before the actions associated with block 420.

At block 435, the actions end. At this point, other synchronization activities (e.g., subsequent or non-initial) may occur.

Figure 5:
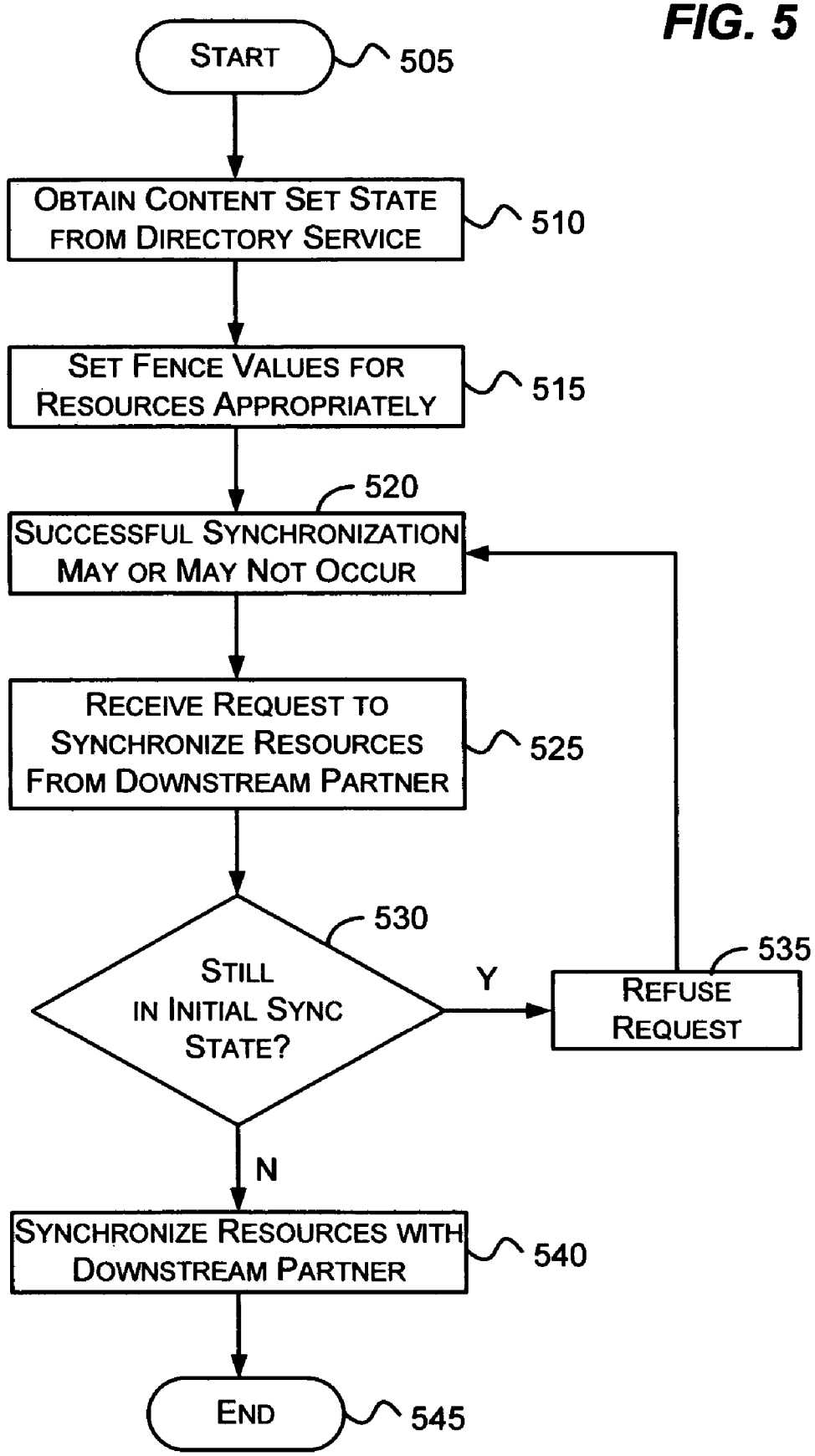
FIG. 5 is a flow diagram that generally represents actions that may occur from a non-primary member's perspective in accordance with aspects of the subject matter described herein.

FIG. 5 is a flow diagram that generally represents actions that may occur from a non-primary member's perspective in accordance with aspects of the subject matter described herein. At block 505, the actions start.

At block 510, the content set state is obtained by consulting a directory service. If the directory service does not indicate that the member is primary, the member may store an initial-sync-needed designation in state data included on the non-primary member. The content set state for the non-primary member indicates that the non-primary member is not allowed to engage in synchronization with a downstream partner.

At block 515, fence values for resources are set as initial-primary. As discussed previously, initial-sync-needed will cause the resources to lose against resources with a fence value of initial-primary or normal. Any time after block 515, the member may request (or re-request) to synchronize resources with an upstream partner. A request may be refused by the upstream partner if, for example, the content set state of the upstream partner is "initial-sync-needed".

At block 520, the non-primary member may or may not synchronize with a certified upstream partner. If the non-primary member does successfully synchronize with a certified upstream partner, the non-primary member may change its content set state to normal (thus, becoming certified). Subsequently, the non-primary member may synchronize with downstream partners.

At block 525, a request to synchronize resources is received from a downstream partner.

At block 530, if the member is still in an initial-sync-needed state, the actions continue at block 535; otherwise, the actions continue at block 540. Branching to block 535 may occur, for example, if the member has not successfully synchronized with an upstream partner.

At block 535, the request is refused and an error indicating the reason (e.g., initial sync has not occurred) may be returned. The actions associated with blocks 520-535 may repeat until the member has successfully synchronized with an upstream partner.

At block 540, synchronization occurs with the downstream partner.

At block 545, the action end. The actions above may be repeated for each non-primary member.

It should be understood that the actions described in conjunction with FIGS. 4-5 are not all-inclusive of all the actions a member participating in a replica group may take when replicating resources. Furthermore, although the actions are described as occurring in a particular order, in other embodiments, some of the actions may occur in parallel or may be performed in another order without departing from the spirit or scope of the subject matter described herein.

As can be seen from the foregoing detailed description, aspects have been described related to resource replication. While aspects of the subject matter described herein are susceptible to various modifications and alternative constructions, certain illustrated embodiments thereof are shown in the drawings and have been described above in detail. It should be understood, however, that there is no intention to limit aspects of the claimed subject matter to the specific forms disclosed, but on the contrary, the intention is to cover all modifications, alternative constructions, and equivalents falling within the spirit and scope of various aspects of the subject matter described herein.

What is claimed is:

1. A computer-readable medium comprised of computer storage media having computer-executable instructions for implementing a replication method of helping to insure correct initialization behavior for a pre-existing content set having resource data such as a set of files under a root directory that exists on a computing system of a member participating in a replica group, the replica group providing the resources of the pre-existing content set to the computing systems of members of the replica group, and wherein the executable instructions for implementing the replication method are comprised of:

beginning a replication service on a computing system of a first member of said replica group, and when the replication service begins executing, requesting from the computing system's directory service configuration information for said pre-existing content set at the first member's computing system;

the replication service then receiving the requested configuration information from the directory service, at least one attribute of the configuration information indicating if the first member is designated as the primary member for said pre-existing content set, and if the first member is designated as a primary member for the pre-existing content set, then:
 at the replication service, setting state data as initial-primary for said pre-existing content set;
 at the replication service, marking resource metadata records of each resource for said pre-existing content set with a fence value of initial-primary; and
 at the replication service, entering into an event log an entry that indicates that said pre-existing content set has been successfully initialized, and is now in an initial-primary state; and if the first member is not designated as the primary member for said pre-existing content set, then:
 at the replication service of the first member, setting state data as initial-sync-needed for said pre-existing content set so that the state data can be later used by the replication service to determine if the replication service should accept replication requests from downstream members of the replica group;
 at the replication service, marking resource metadata records of each resource for said pre-existing content set of the first member with a fence value of initial-sync-needed; and
 at the replication service of the first member, entering into an event log an entry that indicates that said pre-existing content set has been successfully initialized, and is now in an initial-sync-needed state;

thereafter, when a replication service at a downstream member of the replica group establishes a connection with the first member of the replica group and requests replication of its content set, permitting such replication to occur from the first member if the state of the pre-existing content set at the first member is in the initial-primary state, otherwise returning an error; and if the downstream member has successfully completed replication of its content set so as to be synchronized with the first member, the downstream member's content set state then being set to normal so that other downstream members of the replica group my synchronize to any upstream member for which the content set of that member is set to either initial-primary or normal.

2. The computer-readable medium of claim 1, wherein the computer-executable instructions further comprise instructions by which the content set of each member of the replica group maintains at its replication service a version vector that represents the machine's current latest version of each resource within its content set and the latest versions for each resource replicated from other members of the replica group.

3. The computer-readable medium of claim 2, wherein the computer-executable instructions further comprise instructions by which a downstream member of the replica group transmits its version vector when connecting to an upstream member, and the upstream member then subtracting the version vector of the downstream from its version vector so that only those resources of the downstream member are replicated for which the version of the resource is different from that of the upstream member.

4. The computer-readable medium of claim 3, wherein the computer-executable instructions further comprise instructions by which resource versions of a content set are stored as metadata in the replication service of a member.

5. The computer-readable medium of claim 3, wherein the computer-executable instructions further comprise instructions by which a downstream member, prior to requesting those resources of the upstream member for which the version of the resource is different from that of the downstream member, the downstream member first requests tombstones from the upstream member in order to delete any resources no longer active in the content set.

6. The computer-readable medium of claim 2, wherein two members of the replica group which are connecting to complete replication of their content sets with one another have already synchronized with another member of the replica group so that said two members each have content sets that are in the initial-primary or normal state.

7. The computer-readable medium of claim 1, wherein the computer-executable instructions further comprise instructions by which the content set of only one member of the replica group may be set to a normal state while the content set state of all other members of the replica group is in an initial-sync-needed state.

8. The computer-readable medium of claim 1, further comprising requesting that the directory service of the first member update information that indicates when the first member is no longer a designated member of the replica group from which resources are to be propagated.

9. A replication method of helping to insure correct initialization behavior for a pre-existing content set having resource data such as a set of files under a root directory that exists on a computing system of a member participating in a replica group, the replica group providing the resources of the pre-existing content set to the computing systems of the members of the replica group, the method comprising:

beginning a replication service on a computing system of a first member of said replica group, and when the replication service begins executing, requesting from the computing system's directory service configuration information for said pre-existing content set at the first member's computing system;

the replication service then receiving the requested configuration information from the directory service, at least one attribute of the configuration information indicating if the first member is designated as the primary member for said pre-existing content set, and if the first member is designated as a primary member for the pre-existing content set, then:

at the replication service, setting state data as initial-primary for said pre-existing content set;

at the replication service, marking resource metadata records of each resource for said pre-existing content set with a fence value of initial-primary; and at the replication service, entering into an event log an entry that indicates that said pre-existing content set has been successfully initialized, and is now in a initial-primary state; and if the first member is not designated as the primary member for said pre-existing content set, then:

at the replication service of the first member, setting state data as initial-sync-needed for said pre-existing content set so that the state data can be later used by the replication service to determine if the replication service should accept replication requests from downstream members of the replica group;

at the replication service, marking resource metadata records of each resource for said pre-existing content set of the first member with a fence value of initial-sync-needed; and at the replication service of the first member, entering into an event log an entry that indicates that said pre-existing content set has been successfully initialized, and is now in an initial-sync-needed state;

thereafter, when a replication service at a downstream member of the replica group establishes a connection with the first member of the replica group and requests replication of its content set, permitting such replication to occur from the first member if the state of the pre-existing content set at the first member is in the initial-primary state, otherwise returning an error; and if the downstream member has successfully completed replication of its content set so as to be synchronized with the first member, the downstream member's content set state then being set to normal so that other downstream members of the replica group my synchronize to any upstream member for which the content set of that member is set to either initial-primary or normal.

10. The method of claim 9, wherein the content set of each member of the replica group maintains at its replication service a version vector that represents the machine's current latest version of each resource within its content set and the latest versions for each resource replicated from other members of the replica group.

11. The method of claim 9, wherein a downstream member of the replica group transmits its version vector when connecting to an upstream member, and the upstream member then subtracting the version vector of the downstream from its version vector so that only those resources of the downstream member are replicated for which the version of the resource is different from that of an upstream member.

12. The method of claim 11, wherein resource versions of a content set are stored as metadata in the replication service of a member.

13. The method of claim 9, wherein a downstream member, prior to requesting those resources of the upstream member for which the version of the resource is different from that of the downstream member, the downstream member first requests tombstones from the upstream member in order to delete any resources no longer active in the content set.

14. A computer-readable medium comprised of computer storage media having computer-executable instructions for implementing a replication method of helping to insure correct initialization behavior for a pre-existing content set having resource data such as a set of files under a root directory that exists on a computing system of a member participating in a replica group, the replica group providing the resources of the pre-existing content set to the computing systems of members of the replica group, and wherein the executable instructions for implementing the replication method are comprised of:

beginning a replication service on a computing system of a first member of said replica group, and when the replication service begins executing, requesting from the computing system's directory service configuration information for said pre-existing content set at the first member's computing system;

the replication service then receiving the requested configuration information from the directory service, at least one attribute of the configuration information indicating if the first member is designated as the primary member for said pre-existing content set, and if the first member is designated as a primary member for the pre-existing content set, then:

at the replication service, setting state data as initial-primary for said pre-existing content set;

at the replication service, marking resource metadata records of each resource for said pre-existing content set with a fence value of initial-primary; and at the replication service, entering into an event log an entry that indicates that said pre-existing content set has been successfully initialized, and is now in an initial-primary state; and if the first member is not designated as the primary member for said pre-existing content set, then:

at the replication service of the first member, setting state data as initial-sync-needed for said pre-existing content set so that the state data can be later used by the replication service to determine if the replication service should accept replication requests from downstream members of the replica group;

at the replication service, marking resource metadata records of each resource for said pre-existing content set of the first member with a fence value of initial-sync-needed; and at the replication service of the first member, entering into an event log an entry that indicates that said pre-existing content set has been successfully initialized, and is now in an initial-sync-needed state;

thereafter, when a replication service at a downstream member of the replica group establishes a connection with the first member of the replica group and requests replication of its content set, permitting such replication to occur from the first member if the state of the pre-existing content set at the first member is in the initial-primary state, otherwise returning an error; and if the downstream member has successfully completed replication of its content set so as to be synchronized with the first member, the downstream member's content set state then being set to normal so that other downstream members of the replica group are available to synchronize to any upstream member for which the content set of that member is set to either initial-primary or normal;

the fence value for each replicated resource of the content set being set to normal at the replication service of the downstream member that has successfully completed replication of the pre-existing content set;

thereafter when any downstream member of the replica group establishes connection with any upstream member of the replica group, if the content set of the upstream member is in the initial-primary or normal state, allowing replication of the content set to occur with the requesting downstream member, and using the state of the fence value for each resource to resolve any conflicts according to the following: a resource with a normal fence state takes precedence over a resource marked with an initial-primary fence state, a resource with a primary-initial state takes precedence over a resource with an initial-sync-needed state.

15. The computer-readable medium of claim 14, wherein the computer-executable instructions further comprise instructions by which the content set of each member of the replica group maintains at its replication service a version vector that represents the machine's current latest version of each resource within its content set and the latest versions for each resource replicated from other members of the replica group.

16. The computer-readable medium of claim 15, wherein the computer-executable instructions further comprise instructions by which a downstream member of the replica group transmits its version vector when connecting to an upstream member, and the upstream member then subtracting the version vector of the downstream from its version vector so that only those resources of the downstream member are replicated for which the version of the resource is different from that of the upstream member.

17. The computer-readable medium of claim 16, wherein the computer-executable instructions further comprise instructions by which resource versions of a content set are stored as metadata in the replication service of a member.

18. The computer-readable medium of claim 16, wherein the computer-executable instructions further comprise instructions by which a downstream member, prior to requesting those resources of the upstream member for which the version of the resource is different from that of the downstream member, the downstream member first requests tombstones from the upstream member in order to delete any resources no longer active in the content set.

19. The computer-readable medium of claim 15, wherein two members of the replica group which are connecting to complete replication of their content sets with one another have already synchronized with another member of the replica group so that said two members each have content sets that are in the initial-primary or normal state.

20. The computer-readable medium of claim 14, wherein the computer-executable instructions further comprise instructions by which the content set of only one member of the replica group may be set to a normal state while the content set state of all other members of the replica group is in an initial-sync-needed state.

21. The computer-readable medium of claim 14, further comprising requesting that the directory service of the first member update information that indicates when the first member is no longer a designated member of the replica group from which resources are to be propagated.

22. The computer-readable medium of claim 14, wherein the computer-executable instructions further comprise instructions by which conflicts are resolved by giving the state of a fence value a timestamp, and wherein any resource with a fence value marked with the most recent timestamp will be given precedence.

* * * * *